United States Patent [19]
Yamamura et al.

[11] Patent Number: 6,136,227
[45] Date of Patent: Oct. 24, 2000

[54] CARBON-CONTAINING REFRACTORY AND PROCESS FOR PRODUCING THE SAME

[75] Inventors: Takashi Yamamura; Osamu Nomura; Hidenori Tada; Atsushi Torigoe, all of Okayama, Japan

[73] Assignee: Shinagawa Refractories Co., Ltd., Tokyo, Japan

[21] Appl. No.: 08/894,047

[22] PCT Filed: Dec. 13, 1996

[86] PCT No.: PCT/JP96/03642

§ 371 Date: Aug. 12, 1997

§ 102(e) Date: Aug. 12, 1997

[87] PCT Pub. No.: WO97/21641

PCT Pub. Date: Jun. 19, 1997

[30] Foreign Application Priority Data

Dec. 13, 1995 [JP] Japan .................................. 7-324538
Dec. 11, 1996 [JP] Japan .................................. 8-331290

[51] Int. Cl.$^7$ .................................. B01F 3/00; C09K 3/00
[52] U.S. Cl. .................... 252/363.5; 264/29.1; 264/29.5; 264/239; 264/299; 501/94; 501/99
[58] Field of Search .................................. 264/29.1, 29.5, 264/105, 239, 299; 501/94, 99; 252/363.5

[56] References Cited

U.S. PATENT DOCUMENTS 4,028,186  6/1977  Sakai .................................. 195/31 R
4,552,852  11/1985  Manning .................................. 501/105

FOREIGN PATENT DOCUMENTS

4315690 C1  6/1994  Germany .

OTHER PUBLICATIONS

Database WPI, Week 8410, Derwent Publications Ltd., London, GB, AN 84–059839 (Abstract of JP 59 018173 A, Jan. 30, 1984).

*Primary Examiner*—Christopher A. Fiorilla
*Attorney, Agent, or Firm*—Sughrue, Mion, Zinn, Macpeak & Seas, PLLC

[57] ABSTRACT

The object of the invention is to provide carbon-containing refractories which give off little decomposition gas having an offensive odor, exhibit excellent spalling resistance, and are equal or superior in kneading properties and molding properties to the refractories containing a phenolic resin as a binder; and a process for producing the same. To accomplish the object, the invention is characterized by replacing a conventionally employed phenolic resin binder with saccharified starch and/or reduced saccharified starch, a binder containing 40% to 80% by weight of saccharified starch and/or reduced saccharified starch and 20% to 60% by weight of water, or a binder containing 40% to 80% by weight of saccharified starch and/or reduced saccharified starch, 1% to 25% by weight of water, and 5% to 50% by weight of an alcohol having a boiling point of not lower than 80° C.

15 Claims, No Drawings

CARBON-CONTAINING REFRACTORY AND PROCESS FOR PRODUCING THE SAME

This application is a 371 of Pct/JP96/03642 filed Dec. 13, 1996.

FIELD OF THE INVENTION

This invention relates to a carbon-containing refractory and a process for producing the same. More particularly, it relates to a carbon-containing refractory which gives off little decomposition gas (offensive decomposition gas) and are excellent in spalling resistance, kneading properties, and molding properties and to a process for producing the same.

BACKGROUND OF THE INVENTION

A phenolic resin has been widely used for mixing in the kneading of carbon-containing bricks. A phenolic resin used as a binder in kneading a mixture containing carbon, such as graphite, exhibits excellent properties in kneading and molding and a high residual carbon on calcination.

However, use of a phenolic resin involves the following drawbacks or problems.

Firstly, a phenolic resin gives off decomposition gases, such as water, hydrogen, ethylene, phenol, cresol, and xylenol, when carbonized in a temperature range of from 350° C. to 650° C. Of these components, in particular, phenol, cresol, and xylenol cause odor. For example, carbon-containing unburned bricks for use as a furnace lining material are generally supplied as a product after only a drying treatment at about 200° C., laid to form the inner wall of a furnace, and preheated to about 1000° C. before actual use. In the preheating treatment, the phenolic resin decomposes to generate decomposition gas, which is discharged out of the furnace to cause air pollution and odor, etc.

Secondly, where a phenolic resin is used as a binder, the resulting structure is dense and has insufficient open cells because of the excellent molding properties of the phenolic resin. Therefore, the structure is liable to destruction due to evolution of decomposition gas on heating. That is, the brick after hardening by drying has a structure with fewer open cells and little air permeability. Such a structure, while contributing to improvement in brick strength after drying, hinders escape of gas generated by decomposition of the phenolic resin at temperatures higher than the drying and hardening temperature. It follows that the internal pressure increases, leading to destruction of the structure or cracking. This phenomenon becomes more conspicuous as the rate of temperature rise increases or the size of the brick increases. In order to prevent the phenomenon it is necessary to strictly control the rate of temperature rise until the temperature reaches a range in which the phenolic resin no more generates decomposition gas. In the case of unburned bricks, however, since the heat treating temperature for obtaining a product is generally from 200° C. to 300° C., it is difficult to have decomposition gas completely removed before the bricks are supplied as a product. In the production of carbon-containing burned bricks, too, strict temperature control in the drying and burning steps involves many technical and economical problems.

Thirdly, carbon produced from a phenolic resin is glassy carbon inferior in resistance to spalling. That is, where carbon-containing bricks are produced by using a phenolic resin as a binder, although the phenolic resin has a high residual carbon on burning, the resulting products have poor spalling resistance.

Therefore, use of a phenolic resin is not preferred in the production of carbon-containing bricks which are required to have spalling resistance, and carbon-containing bricks which do not use a phenolic resin have been sought. Pitch-bonded type bricks using pitch as a binder are known to meet the demand. However, pitch-bonded carbon-containing bricks, while excellent in spalling resistance, are disadvantageous in that pitch, which is solid at ordinary temperatures, must be heated above the softening point and kneaded (i.e., heat kneading). Besides, pitch is inferior to a phenolic resin in kneading properties and molding properties.

A process comprising uniformly mixing a refractory matrix material and fine powder of a carbon element, such as carbon black, together with an aqueous solution or suspension of a non-aromatic organic high-molecular compound, such as polyacrylate, vinyl polymers, alcohol polymers, and methyl cellulose, has been proposed as a process for producing carbon-containing bricks without using a phenolic resin nor pitch (see a Japanese national phase published patent application No. Hei 7-504641). According to this technique, however, the organic high-molecular compound such as polyacrylate used in the form of an aqueous solution or suspension has poorer kneading properties than a phenolic resin, and the resulting molded articles have a low bulk specific gravity. Further, the binder is inferior to a phenolic resin in kneading properties and molding properties.

It is also known that hexahydric alcohols, such as sorbitol, mannitol, and polysorbitol, are useful as a binder of carbon-containing bricks (see JP-A-52-32912, the term "JP-A" as used herein means an "unexamined published Japanese patent application"). However, when these binders are used, it is difficult to obtain products equal in anticorrosion to those produced by using a phenolic resin.

As stated above, the prevailing phenolic resin is excellent in kneading properties and molding properties notwithstanding the above-mentioned first to third drawbacks. There is no binder that is superior to a phenolic resin in kneading properties and molding properties and yet economical. Accordingly, it is the state of the art to employ a phenolic resin, accepting the first to third drawbacks involved in it.

The present invention has been reached in the light of the disadvantages of the pitch-bonded type, the use of a non-aromatic organic high-molecular compound, and the use of a hexahydric alcohol as well as the first to third drawbacks associating the use of a phenolic resin.

An object of the present invention is to provide carbon-containing refractories which give off little decomposition gas having an offensive odor, exhibit excellent spalling resistance, and are equal or superior in kneading properties and molding properties to the refractory materials containing a phenolic resin as a binder; and a process for producing the same.

DISCLOSURE OF THE INVENTION

The carbon-containing refractory and the process for producing the same according to the present invention are characterized in that:

at least one binder selected from saccharified starch and/or reduced saccharified starch is used;

a binder comprising 40% to 80% by weight of saccharified starch and/or reduced saccharified starch and 20% to 60% by weight of water is used; or a binder comprising 40% to 80% by weight of saccharified starch and/or reduced saccharified starch, 1% to 25% by weight of water, and 5% to 50% by weight of an alcohol having a boiling point of not lower than 80° C.;

in place of a phenolic resin that has conventionally been used, thereby providing carbon-containing refractories and a process for producing the same which meet the above-described object.

The gist of the present invention resides in:

a carbon-containing refractory comprising a mixture containing refractory aggregate and a carbon material, which are characterized in that the mixture contains at least one binder selected from saccharified starch and/or reduced saccharified starch (hereinafter referred to as a first invention);

a carbon-containing refractory and a process for producing the same, which are characterized in that a mixture containing refractory aggregate and a carbon material is kneaded and molded by using a binder comprising 40% to 80% by weight of at least one member selected from saccharified starch and/or reduced saccharified starch and 20% to 60% by weight of water (hereinafter referred to as a second invention); and a carbon-containing refractory and a process for process producing the same, which are characterized in that a mixture containing refractory aggregate and a carbon material is kneaded and molded by using a binder comprising 40% to 80% by weight of at least one member selected from saccharified starch and/or reduced saccharified starch, 1% to 25% by weight of water, and 5% to 50% by weight of an alcohol having a boiling point of not lower than 80° C. (hereinafter referred to as a third invention).

The gist of the present invention also consists in:

a carbon-containing refractory and a process for process producing the same, which are characterized in that a mixture containing refractory aggregate and a carbon material is kneaded with less than 6% by weight of pitch powder and molded by using any of the binders according to the 1st to 3rd inventions (hereinafter referred to as a fourth invention); and a carbon-containing refractory and a process for process producing the same, which are characterized in that the molded article obtained in any one of the 1st to 4th inventions is heat-treated at a temperature not higher than 400° C. and then impregnated with pitch (hereinafter referred to as a fifth invention).

THE BEST MODE FOR CARRYING OUT THE INVENTION

The carbon-containing refractory and the process for producing the same according to the present invention will be explained below in detail. The terminology "carbon-containing refractory" as used herein is intended to include shaped or amorphous ones and burned or unburned ones.

The saccharified starch and/or reduced saccharified starch, which are the constituent components of the binder characteristic of the present invention (1st to 3rd inventions), will be described with respect to their basic functions.

One of their functions is to give a molding material appropriate adhesiveness to inhibit spring back in molding into bricks thereby to obtain a molded article of high packing. Carbon-containing bricks are produced by molding a molding material under high pressure into bricks. When pressure is released, the molded article swells. A molded article having a high density cannot be obtained unless this phenomenon is suppressed. In the present invention (1st to 3rd inventions), the saccharified starch and/or reduced saccharified starch which constitute the binder produce a suppressing action on the phenomenon to provide, as a result, a molded article of high packing.

Another function of the saccharified starch and/or reduced saccharified starch is to give sufficient strength to a molded article after drying. Carbon-containing bricks, often having a large size, require sufficient strength so that they can be handled without being broken. The saccharified starch and/or reduced saccharified starch used in the present invention (1st to 3rd inventions) impart sufficient strength to a dried molded article so that the molded article may be handled without suffering from breakage even when it has a large size.

In order to enjoy the above-described two functions, the binder used in the present invention (1st to 3rd invention) essentially comprises the saccharified starch and/or reduced saccharified starch.

The binder as well as its constituent components are explained in greater detail.

The binder according to the first invention is characterized by comprising saccharified starch and/or reduced saccharified starch. In the first invention, one of them or a mixture of two or more of them can be used. While not limiting, preferred examples include a mixture of starch and intermediates of glucose that is obtained by hydrolysis of starch, and a reduced saccharification product obtained by reducing glucose. The reduced saccharification product may contain a hexahydric straight-chain alcohol in a minor proportion (hereinafter described in detail).

The action (function) of water, which is another component constituting the binder used in the 2nd and 3rd invention in addition to the saccharified starch and/or reduced saccharified starch according to the 1st invention is then explained. In the 2nd and 3rd inventions water is used for adjusting the viscosity of the binder. Since saccharified starch and/or reduced saccharified starch are extremely easily soluble in water, the viscosity of the binder comprising the saccharified starch and/or reduced saccharified starch can easily be adjusted by addition of water.

One of the requirements of a binder is that it should reduce the surface energy of a carbonaceous material, such as graphite, in the kneading of a raw material for producing carbon-containing bricks so as to facilitate molding and to obtain high-density moldings. In other words, because a carbon material having a large specific surface area is used in the production of carbon-containing bricks, whether or not a high-density molded article could be obtained depends on how much the surface energy of the carbon material can be reduced by uniformly coating the carbon material with a binder in the kneading step.

The surface energy of a carbonaceous material, such as graphite, can be reduced by using a binder comprising saccharified starch and/or reduced saccharified starch and water in the 2nd invention and by additionally using an alcohol having a boiling point of not lower than 80° C. in the 3rd invention. As a result, the mixture can easily be molded, and the resulting molded article has a high density.

The binder characteristic of the 2nd invention and the binder characteristic of the 3rd invention will be further illustrated.

The binder according to the 2nd invention is characterized by comprising 40% to 80% by weight of saccharified starch and/or reduced saccharified starch and 20% to 60% by weight of water. The saccharified starch and/or reduced saccharified starch to be used in the binder of the 2nd invention can be one of them or a mixture of two or more of them similarly to the 1st invention. While not limiting, preferred examples include a mixture of starch and intermediates of glucose that is obtained by hydrolysis of starch, and a reduced saccharification product obtained by reducing glucose. The reduced saccharification product may partly contain a hexahydric straight-chain alcohol (i.e., hexahydric polyols, e.g., sorbitol, mannitol, and polysorbitol). Note that binders consisting solely of sorbitol, mannitol, polysorbitol, etc. or those containing these polyols in a large amount generally have a low viscosity (though the viscosity of the binder can be adjusted by adjusting the proportion of water) and, in addition, are inferior in kneading properties and molding properties to the binders of the present invention (1st to 3rd inventions). Therefore, the binder according to the present invention (1st to 3rd inventions) does not include sorbitol, mannitol, polysorbitol, etc. singly nor binders containing these polyols in a large amount. In the present invention (1st to 3rd inventions), it is necessary for the saccharified starch and/or reduced saccharified starch to contain a proper amount of polysaccharides in order for the binder to have proper kneading properties and molding properties.

The proportion of the saccharified starch and/or reduced saccharified starch in the binder of the 2nd invention ranges from 40% to 80% by weight, preferably 60% to 75% by weight. If it is less than 40% by weight, the molding material is less adhesive and shows considerable spring back on molding, failing to provide a molded article having the same or more denseness than that produced by using a phenolic resin. If the proportion exceeds 80% by weight, the binder is too viscous to be dispersed in the molding material uniformly.

Water in the binder of the 2nd invention is used for adjustment of the viscosity of the binder as previously described. It is used in a proportion of 20% to 60% by weight, preferably 30% to 50% by weight. If the proportion of water is less than 20% by weight, the binder is too viscous to sufficiently coat the surface of a carbonaceous material, failing to provide high-density molded articles. If the proportion exceeds 60% by weight, the molding material has extremely reduced adhesiveness, undergoing considerable spring back.

The binder according to the 3rd invention is characterized by comprising three components, i.e., an alcohol having a boiling point of not lower than 80° C. in addition to the binder components of the 2nd invention. Namely, the binder of the 3rd invention is characterized by comprising 40% to 80% by weight of saccharified starch and/or reduced saccharified starch, 1% to 25% by weight of water, and 5% to 50% by weight of an alcohol having a boiling point of not lower than 80° C.

If the mixture contains aluminum or an aluminum alloy, or if basic aggregate, such as dolomite, magnesia or spinel, is used as refractory aggregate, these substances react with water present in a binder, resulting in a failure of preparing a satisfactory molding material.

In such cases, the amount of water should be minimized. This problem is solved by the 3rd invention. That is, in the 3rd invention, the amount of water is decreased by incorporating an alcohol having a boiling point of not lower than 80° C. as hereinafter described in detail.

The saccharified starch and/or reduced saccharified starch to be used as a constituent component of the binder according to the 3rd invention can be one of them or a mixture of two or more of them similarly to the 1st and 2nd inventions. Useful examples include a mixture of starch and intermediates of glucose that is obtained by hydrolysis of starch, and a reduced saccharification product obtained by reducing glucose. Similarly to the 2nd invention, the proportion in the binder is 40% to 80% by weight, preferably 60% to 75% by weight, for the same reasons as mentioned above as for the 2nd invention (omitted here).

The alcohol having a boiling point of not lower than 80° C., which is the constituent component of the binder of the 3rd invention, includes glycols, such as ethylene glycol and diethylene glycol, and monohydric alcohols, such as 2-propanol, 1-butanol, and 1-pentanol. Whichever it may be, it must have a boiling point of 80° C. or higher. If an alcohol whose boiling point is lower than 80° C. is used, the alcohol will vaporize during kneading to increase the viscosity of the binder, failing to provide a satisfactory mixture. While the upper limit of the boiling point is not particularly specified, it is preferably about 250° C. for the sake of production.

The alcohol having a boiling point of not lower than 80° C. should be used in an amount of 5% to 50% by weight, preferably 10% to 30% by weight. If the amount is less than 5% by weight, the surface of a carbonaceous material cannot be coated sufficiently by the binder so that a high-density molded article can hardly be obtained. If it exceeds 50% by weight, the molding material has extremely reduced adhesiveness and undergoes considerable spring back.

Water, the essential component of the binder of the 3rd invention, is used for the purpose of adjusting the viscosity of the binder as stated previously. Unlike the 2nd invention, it is preferably used in an amount of 1% to 25% by weight, still preferably in an amount of 10% to 20% by weight. If the proportion of water exceeds 25% by weight, where the mixture contains metal, such as aluminum or an aluminum alloy, or where basic aggregate, such as dolomite, magnesia or spinel, is used as refractory aggregate, the metal or basic aggregate reacts with water present in the binder, resulting in a failure of providing a satisfactory molding material. Thus, the proportion of water in the binder of the 3rd invention is limited to 25% by weight at the most.

The saccharified starch and/or reduced saccharified starch are easily soluble in water but sparingly soluble in alcohols, such as glycols. Therefore, use of a small amount of water as a solvent is preferred to use of an alcohol as a sole solvent. If the amount of water is less than 1% by weight, it is difficult to adjust the viscosity of the binder comprising the saccharified starch and/or reduced saccharified starch and an alcohol having a boiling point of not lower than 80° C. Accordingly, the proportion of water in the binder according to the 3rd invention is preferably 1% by weight or more.

As stated above, the binder according to the 2nd invention is characterized by comprising two components, i.e., 40% to 80% by weight of saccharified starch and/or reduced saccharified starch and 20% to 60% by weight of water, and the binder according to the 3rd invention is characterized by comprising three components, i.e., 40% to 80% by weight of saccharified starch and/or reduced saccharified starch, 1% to 25% by weight of water, and 5% to 50% by weight of an alcohol having a boiling point of not lower than 80° C. As long as the proportions of these components fall within the above specified respective ranges, the resulting molded article is equal or superior in density and denseness to that obtained by using a phenolic resin while the proportions vary depending on the kind and composition of the kneaded material, for example, the kind of the refractory aggregate or carbon material used or the composition of the kneaded material containing aluminum or an aluminum alloy. The amount of the binder to be used suitably ranges from 1% to 5% by weight based on the kneaded material, while varying on the composition of the binder used and the kind and composition of the kneaded material. This also applies to the 1st invention.

The carbon-containing refractory and the process for producing the same according to the present invention include an embodiment in which a mixture containing refractory aggregate and a carbon material is kneaded with less than 6% by weight, preferably 0.2% to 3% by weight, of pitch powder and molded by using the binder according to the 1st to 3rd inventions (4th invention) as hereinafter described in detail. In this embodiment, the binder is preferably added in an amount of 1% to 5% by weight based on the kneaded material.

The carbon-containing refractories and the process for producing the same according to the present invention include an embodiment in which a mixture containing refractory aggregate and a carbon material, or a mixture containing refractory aggregate, a carbon material, and less than 6% by weight of pitch powder is kneaded together with the binder according to 1st to 3rd inventions and molded, and the resulting molded article is heat-treated at a temperature of not lower than 400° C. and then impregnated with pitch (5th invention) as hereinafter described in detail.

The refractory aggregate which can be used in the present invention include alumina of various kinds, magnesia, spinel, zirconia, and dolomite. The carbon material to be used is not particularly limited and includes graphite, coke, and carbon black. The present invention is also applicable to carbon-containing refractories containing known additives, such as aluminum and silicone, according to necessity, which is also included in the present invention. Action:

All of the outstanding problems the present invention aims to solve can be solved by using the binder according to the present invention (1st to 3rd inventions). Because the binder of the present invention (1st to 3rd inventions) does not generate harmful components, such as phenol, cresol, and xylenol, during carbonization, the carbon-containing refractory produced by using the binder of the present invention (1st to 3rd inventions) shows marked improvements on the problems of air pollution and odor accompanying preheating of a furnace. Since most of the volatile content vaporizes in the drying treatment at about 200° C., leaving little volatile matter that might vaporize at higher temperatures, the structure can be prevented from destruction by generation of decomposition gas. No glassy carbon, which reduces spalling resistance, is produced, thereby making it possible to supply carbon-containing refractories excellent in spalling resistance. The binder of the present invention (1st to 3rd inventions) produces fewer carbon bonds than in using a phenolic resin when burned because of its lower residual carbon than a phenolic resin and is yet equal to a phenolic resin binder in terms of providing refractory bricks having resistance to corrosive slag, which is the most important property required of fire bricks, by virtue of the same or higher packing in molding than in using a phenolic resin.

Thus, the carbon-containing refractory produced by using the binder of the present invention (1st to 3rd inventions) exhibits excellent resistance against cracking caused by decomposition gas of the binder or cracking due to thermal spalling and are equal to those produced by using a phenolic resin binder in anticorrosion. Further, it is easier for the binder of the present invention (1st to 3rd inventions) than for a phenolic resin binder to be combined with pitch powder, thereby making it feasible to provide pitch-bonded carbon-containing refractories by using pitch powder.

Consequently, the carbon-containing refractory of the present invention are also characterized in that a mixture containing refractory aggregate and a carbon material is kneaded with less than 6% by weight, preferably 0.2% to 3% by weight, of pitch powder by using the binder according to the 1st to 3rd inventions and molded (4th invention). The two bonding means chiefly used in conventional carbon-containing bricks are resin bonding using a phenolic resin and pitch bonding in which pitch is used for heat-kneading at a temperature at or above its softening point. Use of the binder of the present invention (1st to 3rd inventions) makes it possible to produce pitch-bonded carbon-containing refractories (carbon-containing bricks) by kneading at ordinary temperatures.

Describing in detail, conventional pitch-bonded bricks have been produced by mixing under heating at or above the softening point of pitch because pitch is solid at ordinary temperatures, whereas the binder of the present invention (1st to 3rd inventions) allows pitch to be used as powder.

Pitch added as powder softens in the temperature range of the drying treatment and diffuses throughout the brick structure to form pitch bonds. Pitch bonds can be formed by using a phenolic resin in the similar manner, but the bonds in the resulting bricks are predominantly made up of glassy carbon resulting from the resin. That is, pitch bonds serve only secondarily and are not always sufficient for compensating for the poor spalling resistance of resin bonds.

To the contrary, the carbon bonds formed by using the binder of the present invention (1st to 3rd inventions) in combination with pitch powder contain no glassy carbon and exhibit excellent spalling resistance equally to pitch-bonded carbon-containing bricks. Since kneading can be carried out at ordinary temperatures, the carbon-containing bricks of the 4th invention are superior to the conventional pitch-bonded ones in working environment and cost.

The pitch which can be used in the present invention (4th invention) is not particularly limited in kind. From the standpoint of diffusibility through the structure during drying, pitch having a softening point of 100° C. to 350° C. and a fixed carbon content of 60% by weight or more which softens at or below the drying temperature is preferred. In the present invention (4th invention), the amount of pitch added should be less than 6% by weight, preferably 0.2% to 3% by weight. The reason for limiting to less than 6% by weight is that more than 6% by weight of pitch causes a marked increase in porosity, resulting in reduction of durability. Pitch can be incorporated into the mixture by mixing into the refractory aggregate or carbon material or by adding to the binder.

The carbon-containing refractories produced by using the binder according to the present invention (1st to 3rd inventions), inclusive of the 4th invention, are also characterized in that the most of the volatile content vaporizes during drying at about 200° C. to provide a dried molded article with numerous open cells. Therefore, only a drying treatment suffices to provide such a molded article that can be impregnated with a secondary binding agent, such as pitch. Accordingly, the carbon-containing refractories according to the present invention are characterized in that a molded article obtained by mixing together with the binder followed by molding is subjected to heat treatment at a temperature or 400° C. or lower and then impregnated with pitch (5th invention).

When a conventional phenolic resin binder is used, the structure after drying has many closed cells. That is, a heat treatment alone is not sufficient for carrying out impregnation. It is not until the dried piece is subjected to coking that it can be impregnated. This has incurred high extra cost.

To the contrary, where the binder of the present invention (1st to 3rd inventions) is used, impregnation can be conducted simply after drying. This will make a great reduction in cost for producing impregnated products and allow an impregnation step to be applied even to cheaper products, thereby supplying highly durable and yet inexpensive impregnated products. It is safe to say that the present invention is innovative from this viewpoint. In the 5th invention, the temperature of the heat treatment before impregnation is limited to 400° C. or lower. A heat treatment at temperatures exceeding 400° C. comes in the area of coking, bringing little advantage in costs.

The carbon-containing refractories according to the present invention (1st to 5th inventions) have excellent spalling resistance and anticorrosion and are useful as not only a lining material for steel making containers but also functional refractories for continuous casting.

EXAMPLES

The present invention will now be illustrated in detail by way of Examples and Comparative Examples, but it should be understood that the present invention is not deemed to be limited thereto. Examples of binder compositions according to the present invention and examples of comparative compositions:

In table 1 below are shown examples of the binder compositions according to the present invention and those of comparative compositions. Binder A is an example of the binder according to the 2nd invention, and binders B to F are examples of the binder according to the 3rd invention. Binder F is a composition out of the range of the binder according to the 2nd invention; and binders G and H are compositions out of the range of the binder according to the 3rd invention; all the binders F to H are for the sake of comparison. Binder I is a conventional binder comprising sorbitol (see JP-A-52-32912), which is presented for comparison.

TABLE 1

|  | Invention | | | | | Comparison | | | Other |
|---|---|---|---|---|---|---|---|---|---|
| Binder Composition | A | B | C | D | E | F | G | H | I |
| Saccharified starch | — | 30 | 70 | 10 | — | 30 | 30 | 90 | — |
| Reduced saccharified starch | 60 | 40 | — | 60 | 60 | — | — | — | — |
| Sorbitol | — | — | — | — | — | — | — | — | 70 |

TABLE 1-continued

|  | Invention | | | | | Comparison | | | Other |
|---|---|---|---|---|---|---|---|---|---|
| Binder Composition | A | B | C | D | E | F | G | H | I |
| Ethylene glycol | — | 15 | 20 | 20 | 20 | — | 40 | 5 | — |
| Water | 40 | 15 | 10 | 10 | 20 | 70 | 30 | 5 | 30 |

Note:
Binder A: Binder of 2nd invention
Binders B to E: Binders of 3rd invention
Binders F to I: Comparative examples As shown in Table 1, the binder according to the present invention can be either one of saccharified starch and reduced saccharified starch (binders A, C, and E) or a combination of two or more thereof (binders B and D).

Examples 1 To 6

Raw materials shown in Table 2 below were compounded together with binder A, B or D according to the mixing ratio shown. The mixture was molded under pressure of 1800 kgf/cm² into bricks of 230×114×65 mm. The molded articles were baked at 200° C. for 10 hours to prepare samples.

Examples 1 to 3 provide examples of applying binder A or B to $Al_2O_3$-C bricks; Examples 2 and 4 to 6 are examples of applying binder B or D to MgO-C bricks; and Examples 1, 2, and 6 are examples of impregnation with pitch. The impregnation with pitch was carried out by impregnating a baked sample with heated pitch.

The bulk specific gravity after molding (hereinafter referred to as post-molding bulk specific gravity) and the apparent porosity of each sample after drying, after impregnation and after burning were measured. The results obtained are shown in Table 2. Further, a corrosion test and a thermal spalling test were conducted as follows. The results of the tests are also shown in Table 2.

In the corrosion test, steel was melted in a high-frequency induction furnace, and the steel manufacture slag was used as a corrosive at 1650° C. The results, converted to indices, are shown in Table 2 as an anticorrosion index. The thermal spalling test was carried out by preliminarily burning a sample of 40×40×230 mm at 1000° C. and dipping the sample in molten steel at 1650° C. The number of cracks generated thereon was coded into numerals in accordance with given rules (see *Taikabutsu*, Vol. 44, No. 2, p. 75 (1992)). The results obtained and converted into indices are shown in Table 2 as "spalling resistance index". The greater these indices, the more satisfactory.

TABLE 2

Examples 1 to 6

|  |  | Example No. | | | | | |
|---|---|---|---|---|---|---|---|
|  |  | 1 | 2 | 3 | 4 | 5 | 6 |
| Magnesia |  | — | 95 | — | 85 | 85 | 85 |
| Alumina |  | 95 | — | 90 | — | — | — |
| Flaky Graphite |  | 3 | 3 | 10 | 15 | 15 | 15 |
| Carbon Black |  | 2 | 2 | — | — | — | — |
| Pitch Powder*[1] |  | 1 | 2 | 2 | — | 2 | 1 |
| Aluminum |  | — | 2 | — | 2 | 1 | 1 |
| Kind of Binder | A | 2.5 | — | — | — | — | — |
|  | B | — | 2 | 2.5 | 3 | — | — |
|  | D | — | — | — | — | 2 | 2 |

TABLE 2-continued

Examples 1 to 6

| | | Example No. | | | | | |
|---|---|---|---|---|---|---|---|
| | | 1 | 2 | 3 | 4 | 5 | 6 |
| | F | — | — | — | — | — | — |
| | G | — | — | — | — | — | — |
| | H | — | — | — | — | — | — |
| | I | — | — | — | — | — | — |
| | Resol*2 | — | — | — | — | — | — |
| Impregnation with Pitch | | done | done | not done | not done | not done | done |
| Bulk Specific Gravity | | 3.3 | 3.15 | 3.15 | 2.98 | 2.95 | 2.97 |
| Apparent Porosity (%) | After Drying | 9.0 | 4.0 | 8.0 | 4.5 | 3.0 | 3.5 |
| | After Impregnation | 3.0 | 1.0 | — | — | — | 1.0 |
| | After Burning | 10.0 | 6.5 | 12.5 | 8.5 | 8.0 | 6.5 |
| Anticorrosion Index*3 | | 70 | 140 | 60 | 100 | 110 | 130 |
| Spalling Resistance Index*4 | | 200 | 100 | 220 | 130 | 140 | 140 |

Note:
*1: Pitch powder having a softening point of 150° C.
*2: Resol type phenolic resin.
*3: The greater, the better.
*4: The greater, the better.

Comparative Examples 1 To 7

For comparison, raw materials were compounded together with the binder shown in Table 3 (see Table 1) at a mixing ratio shown in Table 3, and samples were prepared in the same manner as in the foregoing Examples (Comparative Examples 1 to 7). The post-molding bulk specific gravity, the apparent porosity after drying, after impregnation and after burning, the anticorrosion index, and the spalling resistance index of each sample were measured in the same manner as in the foregoing Examples. The results obtained are shown in Table 3.

Comparative Examples 1 to 3 are examples of using binders F, G or H shown in Table 1 which are out of the range of the compositions of the binder according to the 2nd and 3rd inventions. Comparative Example 4 is an example in which binder A (an example of the composition of the binder according to 2nd invention) is applied to MgO-C bricks containing aluminum. Comparative Examples 5 and 6 are examples in which a resol type phenolic resin (hereinafter simply referred to as resol) is used as a binder (conventional). Comparative Example 7 is an example of using sorbitol alone as a binder (binder I, see Table 1).

TABLE 3

Comparative Examples 1 to 7

| | | Comparative Example No. | | | | | | |
|---|---|---|---|---|---|---|---|---|
| | | 1 | 2 | 3 | 4 | 5 | 6 | 7 |
| Magnesia | | — | 85 | 85 | 85 | — | 85 | 85 |
| Alumina | | 90 | — | — | — | 90 | — | — |
| Flaky Graphite | | 10 | 15 | 15 | 15 | 10 | 15 | 15 |
| Carbon Black | | — | — | — | — | — | — | — |
| Pitch Powder*1 | | 2 | — | — | — | 2 | — | — |
| Aluminum | | — | 2 | 2 | 2 | — | 2 | 2 |
| Kind of Binder | A | — | — | — | 3 | — | — | — |
| | B | — | — | — | — | — | — | — |
| | D | — | — | — | — | — | — | — |
| | F | 3 | — | — | — | — | — | — |
| | G | — | 3 | — | — | — | — | — |
| | H | — | — | 3 | — | — | — | — |
| | I | — | — | — | — | — | — | 3 |
| | Resol*2 | — | — | — | — | 3 | 3 | — |
| Impregnation with Pitch | | — | — | — | — | — | — | — |
| Bulk Specific Gravity | | 3.05 | 2.90 | 2.88 | 2.93 | 3.10 | 2.95 | 2.87 |
| Apparent Porosity (%) | After Drying | 10.0 | 7.0 | 8.0 | 6.0 | 7.0 | 2.5 | 8.5 |
| | After Impregnation | — | — | — | — | — | — | — |
| | After Burning | 12.5 | 11.0 | 12.0 | 10.0 | 12.5 | 8.0 | 12.5 |
| Anticorrosion Index*3 | | 50 | 70 | 60 | 80 | 60 | 100 | 60 |
| Spalling Resistance Index*4 | | 200 | 130 | 130 | 130 | 200 | 100 | 120 |

Note:
*1: Pitch powder having a softening point of 150° C.
*2: Resol type phenolic resin.
*3: The greater, the better.
*4: The greater, the better.

As is apparent from Table 2, it is understood that the samples of Examples 1 through 6, in which binders A, B and D falling within the range of the 2nd and 3rd inventions are used, have a great post-molding bulk specific gravity and exhibit excellent resistance against corrosion and spalling.

To the contrary, the sample of Comparative Example 1, in which binder F is used, has an extremely small anticorrosion index, the binder F being out of the range specified in the 2nd invention and comprising 30% by weight of saccharified starch and 70% by weight of water. In Comparative Example 2 using binder G which contains a small amount (30 wt %) of saccharified starch and is out of the range of the 3rd invention, the sample has a small anticorrosion index, too, a small spalling resistance index, and a low post-molding bulk specific gravity.

In Comparative Example 3, on the other hand, where binder H which contains a large quantity of saccharified starch (90 wt %) and is out of the range of the 3rd invention is used, the sample has a low post-molding bulk specific gravity, a small anticorrosion index, and a small spalling resistance index. Where binder A according to the 2nd invention is applied to Mgo-C bricks containing aluminum, the resulting bricks are inferior in anticorrosion and spalling resistance, and the post-molding bulk specific gravity is low, as is observed in Comparative Example 4. In this case, use of binder B or D brings about improvement in anticorrosion as is observed in Example 4 (see Table 2). It can be seen from this fact that the binder according to the 3rd invention is preferably applied to MgO-C bricks containing aluminum, etc.

Comparison between Example 4 and Example 5 reveals that incorporation of pitch powder brings improvement in anticorrosion and spalling resistance, and comparison between Example 5 and Example 6 indicates that impregnation with pitch brings improvement in anticorrosion (see Table 2).

On comparing Comparative Example 5, which is an example of the conventional technique of using resol, and Example 3 corresponding thereto, it is seen that the sample of Example 3 has a greater post-molding bulk specific gravity than the sample of Comparative Example 5. This proves that the same or higher packing as obtained in using resol can be secured by using binder B according to the 3rd invention. It is seen from the results of the corrosion test and the thermal spalling test that Example 3 is equal in anticorrosion and markedly superior in spalling resistance to that of a conventional product (Comparative Example 5). These tendencies of post-molding bulk specific gravity, anticorrosion, and spalling resistance are also observed on comparing Example 4 and Comparative Example 6. In Comparative Examples 5 and 6 using cresol as a binder, generation of decomposition gas (offensive decomposition gas) was observed. Generation of such offensive decomposition gas was not observed in Examples 1 to 6.

The sample of Comparative Example 7 in which sorbitol was used alone was inferior to the sample of corresponding Example 4 in post-molding bulk specific gravity and anticorrosion.

It has now been proved that the refractories according to the present invention (see Examples 1 to 6) are equal or superior to conventional refractories (see Comparative Examples 5 to 7) in terms of anticorrosion and spalling resistance that are basic characteristics demanded for refractories and will show high durability when used as a lining material of, for example, steel making containers.

Industrial Applicability

As has been described in detail, the present invention is characterized by using, in place of a phenolic resin that has conventionally been used, at least one binder selected from saccharified starch and/or reduced saccharified starch (1st invention);

a binder comprising 40% to 80% by weight of saccharified starch and/or reduced saccharified starch and 20% to 60% by weight of water (2nd invention); or a binder comprising 40% to 80% by weight of saccharified starch and/or reduced saccharified starch, 1% to 25% by weight of water, and 5% to 50% by weight of an alcohol having a boiling point of not lower than 80° C. (3rd invention). By virtue of these characteristics, the present invention produces outstanding effects. That is, the carbon-containing refractories according to the present invention give off little decomposition gas or odor to environmental advantage, exhibits excellent spalling resistance, and are equal or superior in kneading properties and molding properties to those produced by using a phenolic resin.

According to the 3rd invention, in particular, since the amount of water is smaller than in the 2nd invention, the binder of the 3rd invention is suited to refractories containing basic aggregate, such as dolomite, magnesia or spinel, as refractory aggregate or those containing aluminum or an aluminum alloy.

The carbon-containing refractories according to the present invention (4th invention) are characterized in that a mixture containing refractory aggregate and a carbon material is mixed and kneaded with less than 6% by weight of pitch powder by using the binder of the 1st to 3rd inventions and molded. The combined use of the binder of the 1st to 3rd inventions and pitch powder provides carbon-containing refractories which exhibit excellent spalling resistance similarly to the conventional pitch-bonded carbon-containing refractories. Since kneading can be conducted at ordinary temperatures, the present invention is more advantageous than conventional pitch-bonded carbon-containing refractories from considerations of the working environment and cost.

Further, the carbon-containing refractories according to the present invention (5th invention) are characterized by subjecting the molded article obtained in the 1st to 4th inventions to heat treatment at a temperature of not higher than 400° C. and then impregnating the piece with pitch. Such a means alone as drying at 400° C. or lower makes it possible to impregnate the molded article with a secondary binder, thereby providing highly durable impregnated products.

The carbon-containing refractories according to the present invention can be used as a lining material for steel making containers as carbon-containing refractories with execellent spalling resistance and anticorrosion. They are also useful as functional refractories for continuous casting.

What is claimed is:

1. A carbon-containing article produced by:
   kneading and molding a mixture containing refractory aggregate and a carbon material, wherein the mixture further contains a binder comprising 40% to 80% by weight of at least one of saccharified starch and/or reduced saccharified starch and 20% to 60% by weight of water.

2. A carbon-containing article produced by:
   mixing and molding a mixture containing refractory aggregate and a carbon material, wherein the mixture further contains a binder comprising 40% to 80% by weight of at least one of saccharified starch and/or reduced saccharified starch, 1% to 25% by weight of water, and 5% to 50% by weight of an alcohol having a boiling point of not lower than 80° C.

3. A process for producing a carbon-containing article comprising:

kneading and molding a mixture containing refractory aggregate and a carbon material, wherein the mixture further contains a binder comprising 40% to 80% by weight of at least one of a saccharified starch and/or reduced saccharified starch and 20% to 60% by weight of water.

4. A process for producing a carbon-containing heat-treated, impregnated article comprising:

heat treating the molded article after the molding described in claim 2 or 3 at a temperature not higher than 400° C., and then impregnating the heat-treated article with pitch.

5. A process for producing a carbon-containing article comprising:

kneading and molding a mixture containing refractory aggregate and a carbon material, wherein the mixture further contains a binder comprising 40% to 80% by weight of at least one of a saccharified starch and/or reduced saccharified starch, 1% to 25% by weight of water, and 5% to 50% by weight of an alcohol having a boiling point of not lower than 80° C.

6. A carbon-containing article produced by:

forming a mixture containing refractory aggregate, a carbon material, less than 6% by weight of pitch powder, and a binder comprising 40% to 80% by weight of at least one of saccharified starch and/or reduced saccharified starch and 20% to 60% by weight of water, and molding the mixture.

7. A carbon-containing heat-treated, impregnated article produced by:

subjecting the molded article obtained in claim 6 to heat treatment at a temperature not higher than 400° C., and then impregnating the heat-treated article with pitch.

8. A carbon-containing article produced by:

forming a mixture containing refractory aggregate, a carbon material, less than 6% by weight of pitch powder, and a binder comprising 40% to 80% by weight of at least one of saccharified starch and/or reduced saccharified starch, 1% to 25% by weight of water, and 5% to 50% by weight of an alcohol having a boiling point of not lower than 80° C., and molding the mixture.

9. A carbon-containing heat-treated, impregnated article produced by:

subjecting the molded article obtained in claim 8 to heat treatment at a temperature not higher than 400° C., and then impregnating the heat-treated article with pitch.

10. A carbon-containing heat-treated, impregnated article produced by:

kneading and molding a mixture containing refractory aggregate and a carbon material, wherein the mixture further contains a binder comprising 40% to 80% by weight of at least one of saccharified starch and/or reduced saccharified starch and 20% to 60% by weight of water, subjecting the molded article so-obtained to heat treatment at a temperature not higher than 400° C., and then impregnating the heat-treated article with pitch.

11. A carbon-containing heat-treated, impregnated article produced by:

mixing and molding a mixture containing refractory aggregate and a carbon material, wherein the mixture further contains a binder comprising 40% to 80% by weight of at least one of saccharified starch and/or reduced saccharified starch, 1% to 25% by weight of water, and 5% to 50% by weight of an alcohol having a boiling point of not lower than 80° C., subjecting the molded article so-obtained to heat treatment at a temperature not higher than 400° C., and then impregnating the heat-treated article with pitch.

12. Amended A process for producing a carbon-containing article comprising:

forming a mixture containing less than 6% by weight of pitch powder, refractory aggregate, carbon material, and a binder comprising 40% to 80% by weight of at least one of saccharified starch and/or reduced saccharified starch and 20% to 60% by weight of water, and kneading and molding the mixture.

13. A process for producing a carbon-containing heat-treated, impregnated article comprising:

heat treating the molded article after the molding described in claim 12 at a temperature not higher than 400° C., and then impregnating the article with pitch.

14. A process for producing a carbon-containing article comprising:

forming a mixture containing less than 6% by weight of pitch powder, refractory aggregate, carbon material, and a binder comprising 40% to 80% by weight of at least one of saccharified starch and/or reduced saccharified starch, 1% to 25% by weight of water, and 5% to 50% by weight of an alcohol having a boiling point of not lower than 80° C., and kneading and molding the mixture.

15. A process for producing a carbon-containing heat-treated, impregnated article comprising:

heat treating the molded article after the molding described in claim 14 at a temperature not higher than 400° C., and then impregnating the article with pitch.

* * * * *